United States Patent [19]

Stephan

[11] Patent Number: 5,018,919

[45] Date of Patent: May 28, 1991

[54] COMBINED RIGID PROFILE AND STRETCHING ROOF BOLT WITH EXPANSION ELEMENT

[75] Inventor: Peter Stephan, Essen, Fed. Rep. of Germany

[73] Assignee: Bergwerksverband GmbH, Fed. Rep. of Germany

[21] Appl. No.: 491,742

[22] Filed: Mar. 12, 1990

[30] Foreign Application Priority Data

Apr. 15, 1989 [DE] Fed. Rep. of Germany ....... 3912499

[51] Int. Cl.$^5$ .............................................. F16B 13/04
[52] U.S. Cl. ......................................... 411/33; 411/61
[58] Field of Search .................. 411/15, 21, 22, 29, 411/30, 32, 33, 34, 37, 38, 55, 59, 61, 913

[56] References Cited

U.S. PATENT DOCUMENTS

| | | | |
|---|---|---|---|
| 1,394,925 | 10/1921 | Marshall | 411/34 |
| 2,148,977 | 2/1928 | Buck | 411/38 |
| 2,914,983 | 12/1959 | Kopf et al. | 411/29 |
| 3,174,387 | 3/1965 | Fischer | 411/37 |
| 4,312,612 | 1/1982 | Thompson | 411/37 X |
| 4,523,880 | 6/1985 | Isler | 411/33 X |
| 4,657,456 | 4/1987 | Anquetin | 411/61 X |
| 4,720,224 | 1/1988 | Peterken | 411/55 |

FOREIGN PATENT DOCUMENTS 183456  4/1963  Sweden ................. 411/33

*Primary Examiner*—Rodney M. Lindsey
*Assistant Examiner*—Jerry Redman
*Attorney, Agent, or Firm*—Thomas S. Baker, Jr.

[57] ABSTRACT

In rock or roof bolts, in particular combined rigid profile and stretch or strain roof bolts, the bolt bar, except for the bar tip is surrounding by a sheathing tube and the end thereof projecting out of the drillhole mouth is made tensionable with respect to the rock by means of an anchor plate and a screw means. To ensure the immediate loadbearing capability of such a roof or rock bolt, in particular in the filling mortar method, at least one portion (5) of the sheathing tube (3) is provided as expansion element with cutouts (7) distributed into slots (8) and the bolt tip (2) is formed as abutment.

7 Claims, 2 Drawing Sheets

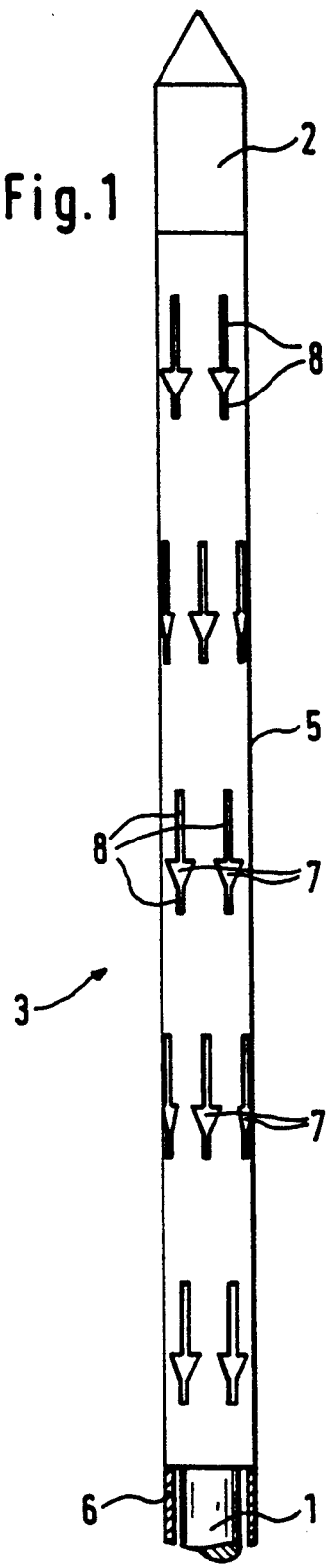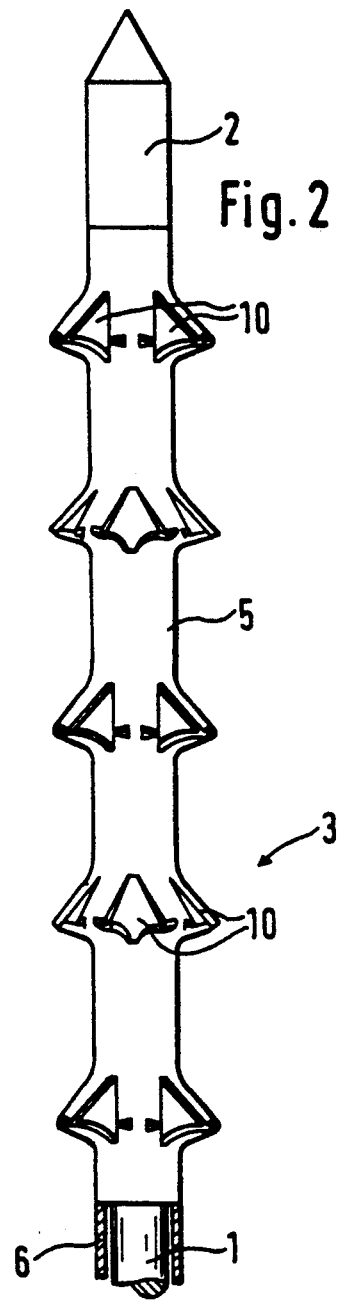

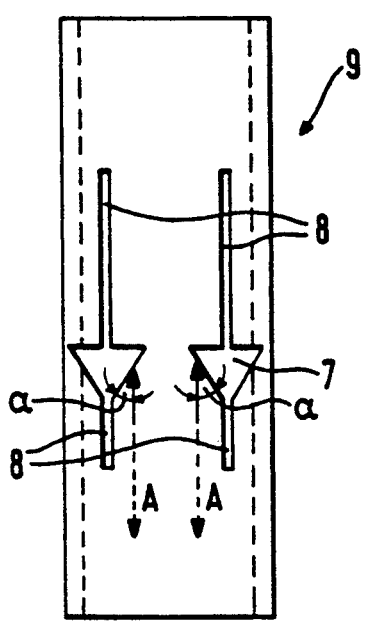
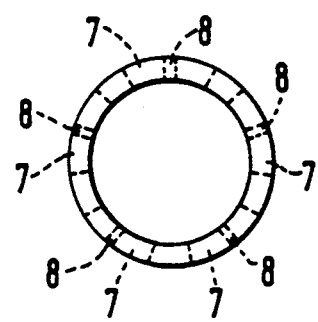
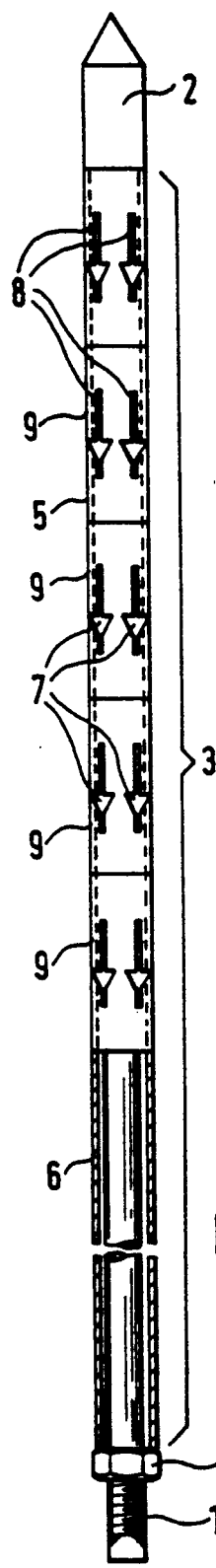
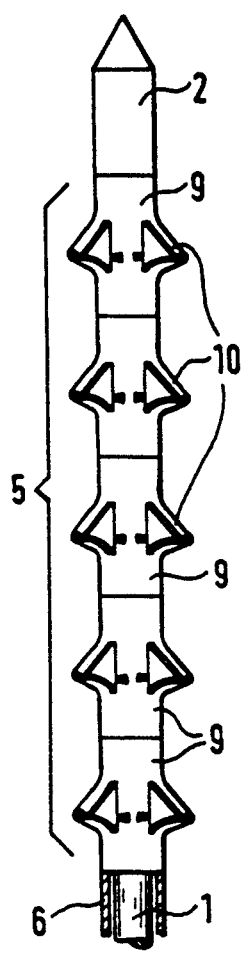
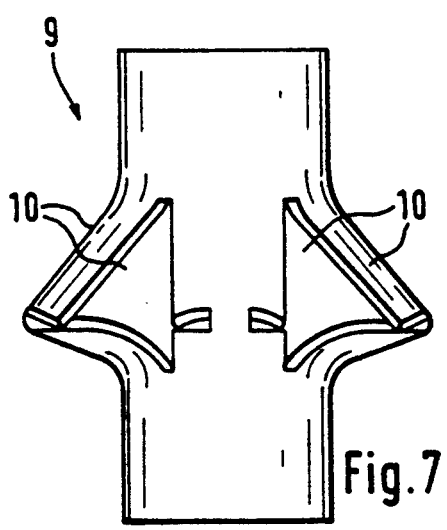

COMBINED RIGID PROFILE AND STRETCHING ROOF BOLT WITH EXPANSION ELEMENT

The invention relates to a roof bolt for securing drifts and rooms in mining and tunnel construction in the form of a combined rigid profile and strain or stretch roof bolt to be placed in particular by the filling mortar method, the bolt bar of which, except for the bolt tip, is surrounded by a sheathing tube and the end of which projecting from the drillhole mouth is tensionable or braceable with respect to the rock by means of an anchor plate and a screw means.

In DE-PS 3,417,252 a rock or roof bolt is described of which the bolt bar, except for its mixing tip formed as forming element, is surrounded over its entire length by a sheathing tube which consists of two portions and the portion of which arranged in the drillhole bottom is connected in each case in force-locking manner to the bolt bore and the other sheathing tube portion. Such a roof bolt, also referred to as combined rigid profile and stretch bolt, which is adhesively attached in the borehole, acts initially on curing of the adhesive as rigid bolt with high tensile strength and only assumes the function of a strain or stretch bolt when a predetermined load force is exceeded. The taking over of the immediate load force depends however fully on a rapidly curing adhesive.

The use of a combined bolt and its immediate effect was hitherto for example not possible in conjunction with the filling mortar method requiring a relatively long setting time. It is also not possible to place the combined bolt without adhesion or mortaring, for example with expansion sleeve systems. Expansion sleeve systems which after introduction of the bolt into the drillhole are pressed against the drillhole wall by a cone or other wedge element require for functionability of the system relatively precise borehole diameters. A further disadvantage of the expansion sleeve systems resides in that most expansion elements are made from cast iron and under excessive tensioning forces tend to fail by breakage.

The invention is now based on the problem of providing a roof bolt which permits the use of an immediately load-bearing combination bolt with the corresponding advantages in particular according to the filling mortar method.

This problem is solved according to the invention in that at least one portion of the sheathing tube is provided as expansion element with cutouts distributed over the periphery and the length and incorporated into slots and the bolt tip is formed as abutment.

The configuration and function of the expansion element permit both unproblematical introduction of the bolt into a mortar-filled drillhole and the immediate taking up of the load force after placing. The expansion operation is carried out by means of a screwer which via the tensioning nut at the drillhole mouth pulls the bolt bar out of the sheathing tube and thereby deforms the expansion sleeve, or by means of a hollow cylinder. The self-adapting diameter of the roof bolt, i.e. of the expanding sheathing tube, permits insertion and effective tensioning or bracing in drillholes even without filling mortar methods and said boreholes need not have any precise diameter, due for example to friable layers.

The cutouts extending above and below in the longitudinal direction of the bolt axis and incorporated into slots have, like the slots themselves, sharp edges so that on deformation of the sheathing tube section the resulting bentout portions penetrate into the drillhole wall like sharp claws and form a spreading or expansion element. To accelerate the bending up of the cutouts in the upsetting operation both as regards direction and effect the invention provides that the cutouts merging above and below into slots have triangular or quadrangular geometric forms with at least two sides forming an angle with the upsetting direction.

The expansion element according to the invention is insensitive to deviations of the drillhole diameter. Depending on the requirements of the supporting force to be applied it is found advantageous for the sheathing tube to be formed over the entire length or in sections as expansion element. It will be found expedient to form only the portion of the sheathing tube following the bolt tip as expansion element.

The portion of the sheathing tube provided as expansion element can be fitted onto the rock bolt as independent portion or alternatively made up from a plurality of individual elements. The number of cutouts or recesses is to be adapted to the diameter and the material of the sheathing tubes, a softer material requiring less slots.

Several examples of embodiment of the invention are illustrated in the drawings and will be explained in detail hereinafter:

In the drawings:

FIG. 1 shows a partial illustration of an example of embodiment of a combibolt having a sheathing tube portion formed as expansion element in the not upset state, FIG. 2 shows the example of embodiment illustrated in FIG. 1 with upset expansion element, FIG. 3 shows a further example of embodiment of a combined rock or roof bolt comprising an expansion element in the not upset state made up of individual elements, FIG. 4 shows the example of embodiment illustrated in FIG. 3 in the upset state, FIG. 5 shows an individual element for a sheathing tube portion forming an expansion element in the not upset state, FIG. 6 shows a section through the individual element illustrated in FIG. 5 and FIG. 7 shows an individual element as illustrated in FIG. 5 in the upset state.

The example of embodiment of a combined roof bolt partially illustrated in FIG. 1 in the not upset state consists substantially of a bolt bar 1 of strainable or stretchable steel which is provided at the drillhole bottom with a bolt tip 2 formed as abutment and except for the bolt tip 2 is surrounded over the entire length by a sheathing tube 3 consisting of two portions 5 and 6. The portion 5 is provided with cutouts or recesses 7 arranged distributed over the periphery and length and incorporated into slots 8. In the longitudinal direction of the portion 5 the cutouts 7 are each formed offset with respect to each other. The slots 8 and the cutouts 7 are each made with sharp edges so that the slots 8 and cutouts 7 bent out in the upset state as apparent from FIG. 2 form sharp-edged claws 10.

The deviations between the not upset and upset example of embodiment illustrated in FIGS. 3 and 4 of a combined rock bolt if compared with the example of embodiment illustrated in FIGS. 1 and 2 reside in that the sheathing tube portion 5 of the sheathing tube 3 is made up of individual elements 9. An individual element 9 is shown in detail in FIG. 5. The cutouts 7 merging into slots 8 above and below have triangular or polygonal geometrical forms having at least two sides forming an angle $\alpha$ with the upsetting direction indicated by the dashed-line double arrows A. It is apparent from the section of FIG. 6 that for example distributed in uniform distance over the periphery five cutouts 7 are provided. The individual element 9 is again shown in FIG. 7 in the upset state.

I claim:

1. A roof bolt adapted to be inserted in a bolt bore for securing drifts and rooms in mining and tunnel construction characterized by a bolt bar having a bolt tip rigidly affixed to one end thereof and a force element at the opposite end of said bolt bar; walls defining a hollow, collapsible sheathing tube mounted on said bolt bar intermediate said bolt tip and said force element and adapted to collapse when said force element is moved toward said bolt tip, and wherein said sheathing tube has a plurality of spaced circumferential rows of cutouts which open into slots formed in the walls of said sheathing tube to cause said tube to have a plurality of rows of radially extending elements adapted to engage the walls of said bolt bore when said sheathing tube is collapsed.

2. The roof bolt according to claim 1 further characterized in that the cutouts formed in said sheathing tube are centrally formed within said slots and said cutouts have polygonal geometrical shapes having at least two sides which form an angle with the longitudinal axis of said bolt bar.

3. The roof bolt according to claim 1 characterized in that said sheathing tube is formed as a unitary element.

4. The roof bolt according to claim 1 characterized in that said sheathing tube includes an inner portion adjacent said bolt tip having said spaced circumferential rows of cutouts and slots and an outer portion adjacent said force element having a solid wall.

5. The roof bolt according to claim 4 characterized in that the inner portion of the sheathing tube has a plurality of individual collapsible elements.

6. The roof bolt according to claim 5 characterized in that the individual elements comprising the inner portion of said sheath each have at least one row of circumferentially arranged cutouts.

7. The roof bolt according to claim 1 further characterized in that the edges defining said cutouts and slots are tapered so as to form a plurality of radially extending sharp edges when said sheathing tube has been collapsed.

* * * * *